United States Patent

[11] 3,537,532

[72] Inventor Henry A. Padgett
 Route 1, Monetta, South Carolina 29105
[21] Appl. No. 629,450
[22] Filed April 10, 1967
[45] Patented Nov. 3, 1970

[54] CULTIVATOR ARM
 1 Claim, 6 Drawing Figs.
[52] U.S. Cl. .................................................. 172/741,
 172/753, 172/763, 172/774
[51] Int. Cl. .................................................. A01b
 39/22, A01b 15/12
[50] Field of Search .......................................... 172/762,
 763, 753, 741, 656, 773, 691, 697, 694; 306/1.5

[56] References Cited
 UNITED STATES PATENTS
 928,487 7/1909 Williams et al. ............... 172/691X

| 2,781,712 | 2/1957 | Thomas et al. ............... | 172/656 |
| 2,781,733 | 2/1957 | Graham ....................... | 172/762X |
| 3,026,946 | 3/1962 | Rizer .......................... | 172/656 |
| 3,091,299 | 5/1963 | Truelove ...................... | 172/762X |

FOREIGN PATENTS
 609,358 9/1948 Great Britain ................ 172/656

Primary Examiner—Robert E. Pulfrey
Assistant Examiner—Alan E. Kopecki
Attorney—Harrington A. Lackey ABSTRACT: A cultivator arm for supporting a cultivator tool, having a shoulder for engaging the front face of one of the cultivator frame beams, and pin attachment means for securing the arm to the beams.

Patented Nov. 3, 1970 3,537,532
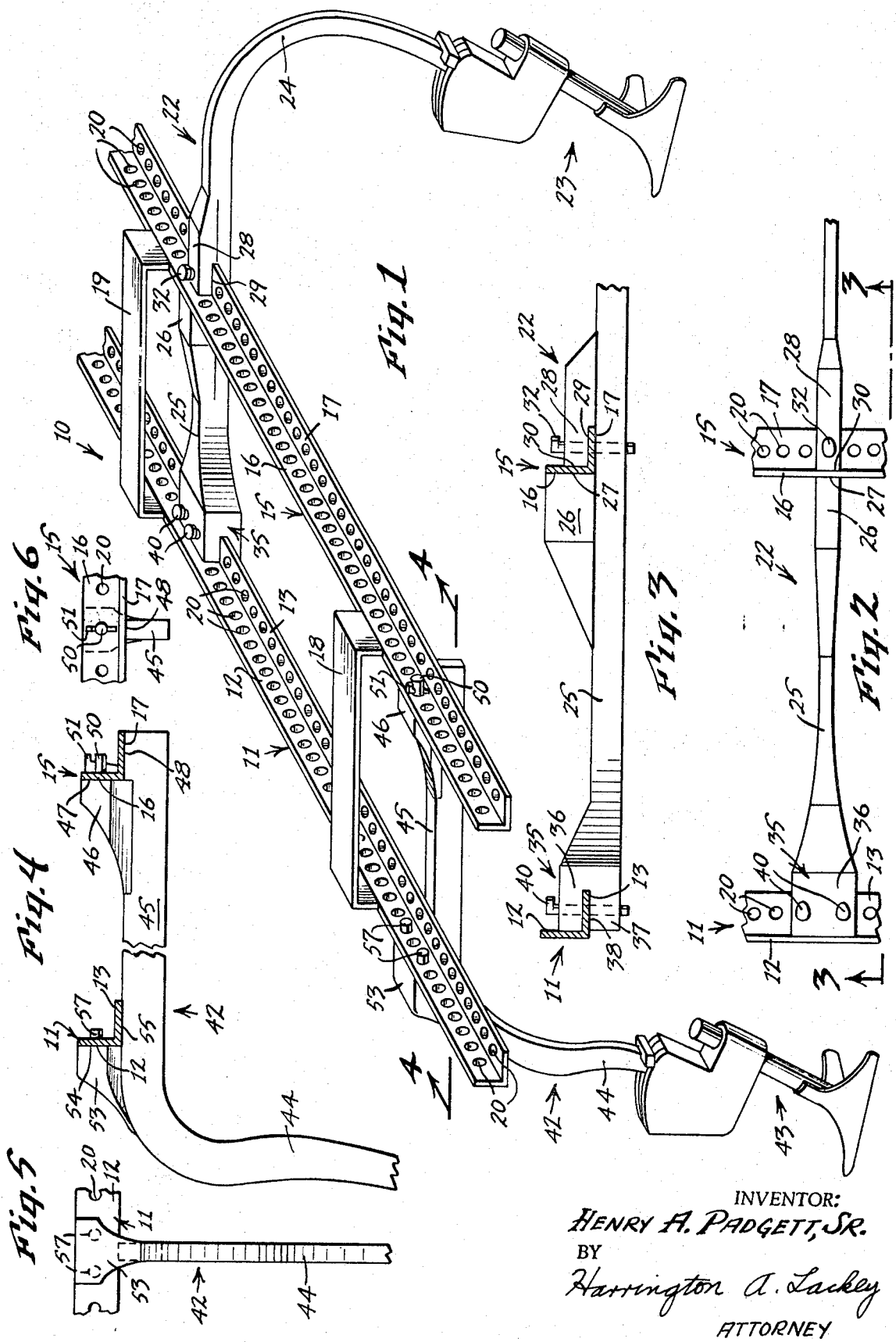
INVENTOR:
HENRY A. PADGETT, SR.
BY
Harrington A. Lackey
ATTORNEY 3,537,532

CULTIVATOR ARM

BACKGROUND OF THE INVENTION

This invention relates to a cultivator arm for supporting a cultivator tool upon a frame, and more particularly to means for securing the cultivator arm to the spaced cultivator angle beams.

It has been the conventional practice in the cultivator art to detachably secure the various cultivator elements, such as the tool or blade, the shank and the frame to each other by nuts and bolts. Although nuts and bolts in themselves may be adequate securing means, nevertheless they are inadequate for detachably securing cultivator parts, which are exposed to hard wear and inclement weather. Whenever any of the cultivator parts, such as the tool or shank need to be adjusted, or replaced or repaired, because of fracture, bending or wear, considerable down-time is experienced in removing and replacing the nuts and bolts. Even if the nuts and bolts are in perfect condition, a certain amount of time is required to unthread the nuts, remove the bolts, reinsert the bolts and rethread the nuts on the bolts. However, in most cases, the nuts have rusted on the bolts, requiring extraordinary effort or additional tools to release the nuts, and in extreme situations, require tools for shearing the bolts from the cultivator parts.

Although the Rizer U.S. Pat. No. 3,026,946 has substantially solved the problems of the nuts and bolts by replacing them with clamps and tapered pins for securing the cultivator arm to the transverse cultivator beams, nevertheless there are other problems in the attachment of the cultivator arm to the beams which have not been solved by Rizer. Rizer merely provides clamps and tapering pins for quickly securing and detaching the cultivator arm to the crossbeams, but provides no means for adequately absorbing the thrusts transmitted from the cultivator arm to the crossbeams by means of the loads encountered by the cultivator tool.

SUMMARY OF THE INVENTION

It is therefore an object of this invention to provide a cultivator arm for readily and detachably securing a cultivator tool to the transverse beams of the cultivator, but also to provide adequate attachment means for absorbing the thrusts generated by the loads encountered by the tool and transmitted through the arm to the beams.

It is a further object of this invention to provide a cultivator arm provided with attachment means which will adequately resist not only the axial forces transmitted from the arm to the beams, but also the pivotal forces and twisting torques.

Another object of this invention is to provide a cultivator arm provided with attachment means which are formed integrally with the arm, and require no additional parts except securing or drop pins for attaching the arm to the cultivator beams.

BRIEF DESCRIPTION OF THE DRAWING

FIG. 1 is a perspective view of a conventional cultivator frame incorporating a front and rear beam, showing two forms of cultivator arms mounted on the beams in operative position;

FIG. 2 is a fragmentary top plan view of the cultivator beams disclosing one form of cultivator arm for supporting a trailing cultivator tool;

FIG. 3 is a section taken along the line 3–3 of FIG. 2;

FIG. 4 is a section taken along the line 4–4 of FIG. 1 disclosing the other form of cultivator arm for supporting a leading cultivator tool;

FIG. 5 is a fragmentary front elevation of the cultivator arm disclosed in FIG. 4; and FIG. 6 is a fragmentary rear end elevational view of the cultivator arm disclosed in FIG. 4.

DESCRIPTION OF THE PREFERRED EMBODIMENT

Referring now to the drawings in more detail, FIG. 1 discloses a typical cultivator frame 10 including a front beam 11 of angle iron construction including an upstanding front flange 12 and a rearwardly directed bottom flange 13. Spaced rearwardly of and parallel to the front beam 11 is the rear beam 15 of angle iron construction also having an upstanding front flange 16 and a rearwardly directed bottom flange 17. The beams 11 and 15 are supported in substantially coplanar parallel relationship by means of the supporting braces 18 and 19. Formed in each of the flanges 12, 13, 16 and 17 are a plurality of longitudinally spaced apertures 20.

The frame 10 may be supported in any conventional manner to a prime mover, such as a tractor, for moving the frame 10 forward and substantially perpendicular to the longitudinal axes of the beams 11 and 15.

One form of the cultivator arm 22 made in accordance with this invention is disclosed in FIGS. 1, 2 and 3, and is particularly designed for supporting a trailing tool, such as the plow shoe member 23, attached to the trailing shank portion 24 of the arm 22.

Extending forwardly from the shank portion 24 is the elongated attachment member 25 of the arm 22 which extends longitudinally of the frame 10 and spans both beams 11 and 15. Projecting upwardly and forming an integral part of the attachment member 25 is an enlarged shoulder 26 having a planar rear face 27 adapted to abut flush against the forward face of the upstanding flange 16 of the rear beam 15. Also projecting upwardly and forwardly from the attachment member 25 slightly rearwardly of the shoulder 26 and forming an integral part of the attachment member 25 is a flange 28 spaced above the main portion of the attachment member 25 to form a clevis having a transverse slot 29 for receiving the bottom flange 17 of the rear beam 15. The front edge 30 of the clevis flange 28 is preferably spaced slightly rearwardly of the shoulder face 27 a distance substantially equal to the thickness of the upstanding 16 of the rear beam 15 in order to slidably receive the flange 16.

Thus, in order to attach the cultivator arm 22 to the rear beam 15, the slot 29 and opposing faces 27 and 30 must be aligned with the end of the rear beam 15, and the arm 22 slidably moved longitudinally of the rear beam 15 to the desired position. After the arm 22 is located in its desired position, a drop-pin 32 is inserted through a mating pin hole, not shown, in the clevis flange 28, an aligned aperture 20 in the bottom flange 17, and in another aligned pin hole, not shown, extending through the bottom portion of the attachment member 25.

The front end of the attachment member 25 comprises a front clevis 35 having an upper forwardly extending flange 36 which projects upwardly and forms an integral part of the attachment member 25. The bottom flange 37 of the clevis 35 comprises the main body portion of the attachment member 25 and is spaced from the upper flange 36 to form a transverse slot 38 for slidably receiving the bottom flange 13 of the front beam 11. The slot 38 is slipped over the bottom flange 13 simultaneously with the movement of the slot 29 along the bottom flange 17 of the rear beam 15. One or more front drop-pins 40 are inserted through registering pin holes, not shown, in the upper flange 36 and the lower flange 37, when they register with corresponding apertures 20 in the bottom flange 13.

As best disclosed in FIGS. 1 and 2, the width of the clevis 35 is slightly greater then the width of the clevis flange 28, and preferably great enough to span approximately three apertures 20. The clevis 35 is preferably provided with two sets of pin holes for receiving two front pins 40, as shown. Thus, the wide clevis 35 provides additional lateral stability, and particularly for resistance against twisting torques which may be caused by a lateral force exerted upon the plow shoe member 23 and transmitted through the arm 22 to the front beam 11.

By virtue of the construction of the shoulder 26 and the front and rear clevises 28 and 35, all of which are integral parts of the attachment member 25, the cultivator arm 22 is rigidly secured with a minimum of effort and parts to the frame beams 11 and 15, and yet may be quickly and easily detached and removed when desired. Moreover, the cultivator arm 22 is constructed to readily absorb the thrusts exerted upon and transmitted through it by the plow shoe member 23. Shoulder 26 is adapted to readily transmit the rearward axial thrust exerted by the arm 22 upon the frame 10, while the clevis members 28 and 35 are adapted to resist any possible forward thrust exerted upon the frame 10. Moreover, the close-fitting slots 29 and 38 are adapted to rigidly secure the arm 22 against the vertical thrusts in either direction as well as moments of force exerted upon the shank portion 24 in either direction and acting upon either beam 11 or 15 as a pivotal axis. The width of the clevis member 35 is also sufficient, as previously mentioned, to resist axial torque or twisting forces. Thus, the only forces which might exert any substantial stress upon the drop-pins 32 and 40 would be lateral translatory forces, which would be minimal, in view of the offset spacing of the plow shoe member 23 from either beam 11 or 15.

FIGS. 1, 4, 5 and 6 disclose a modified form of the cultivator arm 42 adapted to support a leading cultivator tool, such as a plow shoe member 43, supported by a leading shank portion 44. The elongated attachment member 45 extending rearwardly from the shank portion 44 is sufficiently long to span the distance between the front beam 11 and the rear beam 15.

The attachment member 45 is also provided with an upwardly projecting rear shoulder 46 forming an integral part of the attachment member 45 and having a rear planar face 47 for engaging flush against the front face of the upstanding flange 16 of the rear beam 15. The top portion 48 of the attachment member 45 immediately adjacent to and rearwardly of the shoulder face 47 forms a flat or planar rear flange seat disposed at a right angle to the shoulder face 47 for abutting flush against the bottom surface of the bottom flange 17 of the rear beam 15. Thus, the shoulder face 47 and seat 48 provide a firm and solid support for receiving the rear beam 15.

Projecting rearwardly from and fixed to or forming an integral part of the shoulder face 47 is a rear pin 50 adapted to extend through an aperture 20 in the upstanding flange 16 of the rear beam 15 in operative position. The pin 50 extends rearwardly a sufficient distance to incorporate a vertical slot for receiving a locking key or wedge 51 in order to lock the rear portion of the attachment member 45 to the rear beam 15, as disclosed in FIGS. 1, 4 and 6.

Projecting upwardly and forming an integral part of the forward portion of the attachment member 45 is a front shoulder 53 having a planar rear shoulder face 54 for engaging flush against the front surface of the upstanding flange 12 of the front beam 11 in operative position. The top portion of the attachment member 45 immediately to the rear of the shoulder face 54 also forms a planar front flange seat 55 perpendicular to the shoulder face 54 for abutting flush against the bottom surface of the bottom flange 13 of the front beam 11. Fixed to and projecting rearwardly of the front shoulder 53 are one or more front pins 57 adapted to register with and extend through corresponding apertures 20 in the upstanding flange 12 when the front beam 11 is properly seated against the shoulder face 54 and the seat 55.

The cultivator arm 42 does not have to be slipped over the ends of the beams 11 and 15, but may be fitted in the desired positions upon the beams 11 and 15 by simultaneously inserting the pins 57 through apertures 20 in the upstanding flange 12 while the rear pin 50 is being inserted through a corresponding aperture 20 in the upstanding flange 16, until both beams 11 and 15 are properly seated flush against their corresponding shoulder faces 54 and 47 and flange seats 55 and 48.

It will be noted that no locking key is employed to secure the front pins 57, since the locking key 51 for engaging the rear pin 50 is adequate to securely attach the cultivator arm 42 to the beams 11 and 15.

The front shoulder 53 on the cultivator arm 42 may be wide enough to span three apertures, if desired, in order to provide additional strength against the resistance encountered by the leading shoe member 43. Consequently, a pair of front pins 57 may be employed to be inserted through a pair of apertures 20. Both seats 55 and 48 formed on the top surfaces of the attachment member 45 provide resistance to the tendency of the attachment member 45 to pivot upwardly when the shoe member 43 engages a load and is thrust rearwardly.

It is thus apparent that whether either or both types of cultivator arms 22 and 42 are mounted on the frame 10, that either may be quickly attached and detached from the front and rear beams 11 and 15 by merely placing the respective arms 22 and 42 in position and inserting the appropriate drop-pins through the mating apertures 20. By simply reversing the procedure, either or both arms may be quickly removed.

Moreover, the construction of both the arms 22 and 42, and particularly the shoulder portions for resisting axial thrusts and twisting torques, and the location of the major body portions of the attachment members 25 and 45 below the bottom flanges 17 and 13 to resist the upward pivotal movements of these attachment members exerted by the moments of force caused by the loads engaged by the respective shoe members 23 and 43, is unique and superior to the cultivator arms previously known and used.

It will be apparent to those skilled in the art that various changes may be made in the invention without departing from the spirit and scope thereof, and therefore the invention is not limited by that which is shown in the drawings and described in the specification, but only as indicated in the appended claims.

I claim:

1. In a cultivator having a frame including spaced apart front and rear angle beams, each beam having an upstanding flange and a rearwardly directed bottom flange and longitudinally spaced apertures in said flanges, the faces of said flanges being unobstructed from one end of each beam along the cultivator arm attachment portion of said beam, a cultivator arm comprising:
   a. a shank portion for supporting a cultivator tool;
   b. an elongated attachment member extending from said shank portion and spanning said front and rear beams;
   c. a rear shoulder forming an integral part of and projecting upwardly from said attachment member for engagement with the forward face of the upstanding flange of said rear beam in operative position;
   d. a clevis forming an integral part of said attachment member and having a forwardly opening slot for receiving the bottom flange of said rear beam;
   e. the portion of said clevis above said slot being spaced from said rear shoulder a distance substantially equal to the thickness of the upstanding flange of said rear beam for receiving said upstanding flange;
   f. a rear pin;
   g. pin holes through said rear clevis aligned with an aperture in said bottom flange for receiving said rear pin in operative position;
   h. a front clevis forming an integral part of said attachment member and having a slot with a forwardly facing opening for receiving the bottom flange of said front beam;
   i. at least one front pin; and
   j. pin holes through said front clevis aligned with at least one aperture in the bottom flange of said front beam for receiving each of said front pins in operative position.